_United States Patent_ [19]

Samson

[11] Patent Number: 4,531,924
[45] Date of Patent: Jul. 30, 1985

[54] TURKEY CALLING AID

[76] Inventor: Ralph D. Samson, Rte. 2, Runnells, Iowa 50237

[21] Appl. No.: 500,890

[22] Filed: Jun. 3, 1983

[51] Int. Cl.³ .............................................. A63H 5/00
[52] U.S. Cl. ................................................. 446/213
[58] Field of Search ..................... 46/174, 175 R, 177, 46/189, 178, 190, 191, 1 F; 446/176, 213

[56] References Cited

U.S. PATENT DOCUMENTS

| | | | |
|---|---|---|---|
| 285,917 | 10/1883 | Ober | 446/213 |
| 443,927 | 12/1890 | Weigle | 446/213 |
| 835,660 | 11/1906 | Bigford | 15/222 |
| 933,504 | 9/1909 | Vaughan | 15/222 |
| 1,122,485 | 12/1914 | Donaldson | 446/213 |
| 1,509,956 | 9/1924 | Kipp | 46/191 |
| 1,607,366 | 11/1926 | Reitzes | 15/222 |
| 1,776,916 | 9/1930 | Linney | 446/213 |
| 2,205,063 | 6/1940 | Hester | 15/222 X |
| 2,372,556 | 3/1945 | David | 15/222 X |
| 2,919,919 | 1/1960 | Ebb | 446/213 X |
| 3,516,195 | 6/1970 | Batley | 46/191 X |
| 3,621,606 | 11/1971 | Potrzuski | 46/1 F X |
| 3,837,115 | 9/1974 | Vennola | 46/174 |

FOREIGN PATENT DOCUMENTS 2402470  7/1974  Fed. Rep. of Germany ............ 27/4

_Primary Examiner_—F. Barry Shay
_Attorney, Agent, or Firm_—Henderson & Sturm

[57] ABSTRACT

A method and apparatus for calling wild turkeys using a strip of flexible cloth which is longer than wide and having a first end and a second end, a reinforcement structure at each end of the cloth for holding the ends straight, and a flap attached to each of the side edges of the cloth. The method includes the steps of grasping one end of the cloth with one hand, grasping the other end of the cloth with the other hand, moving the hands towards each other while holding the ends whereby the cloth is allowed to become loose, and rapidly jerking the hands apart while still holding the cloth to stretch the cloth tight, thereby simulating the sound of a wild turkey flapping its wings.

10 Claims, 6 Drawing Figures

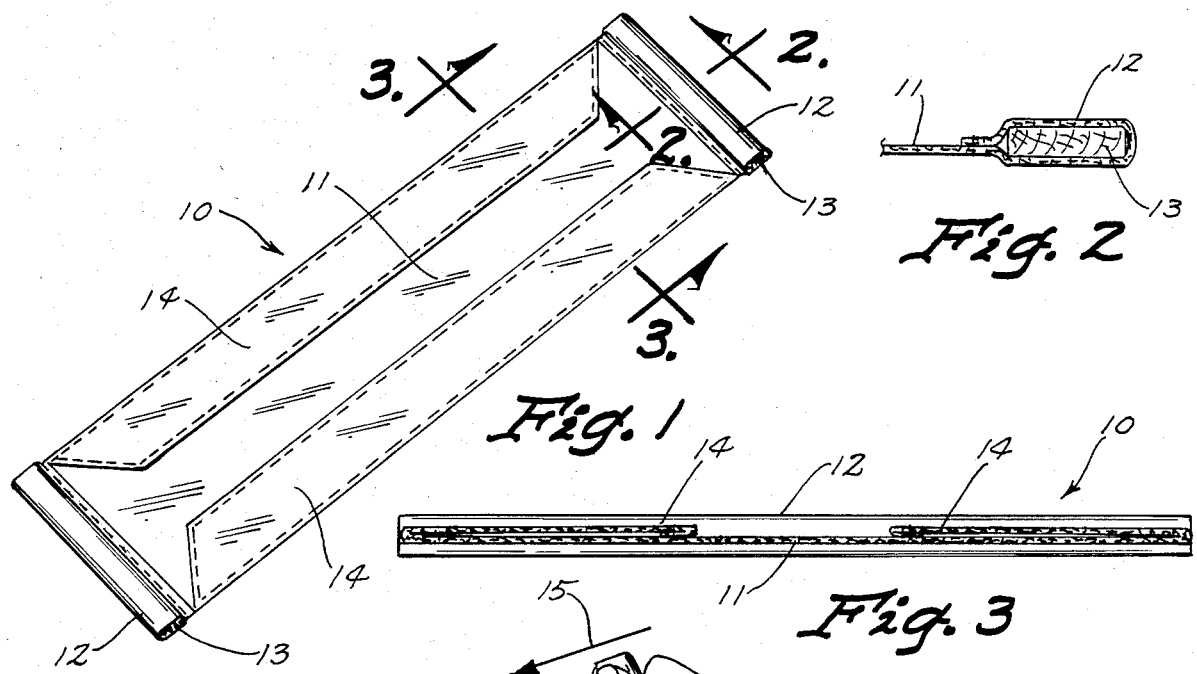
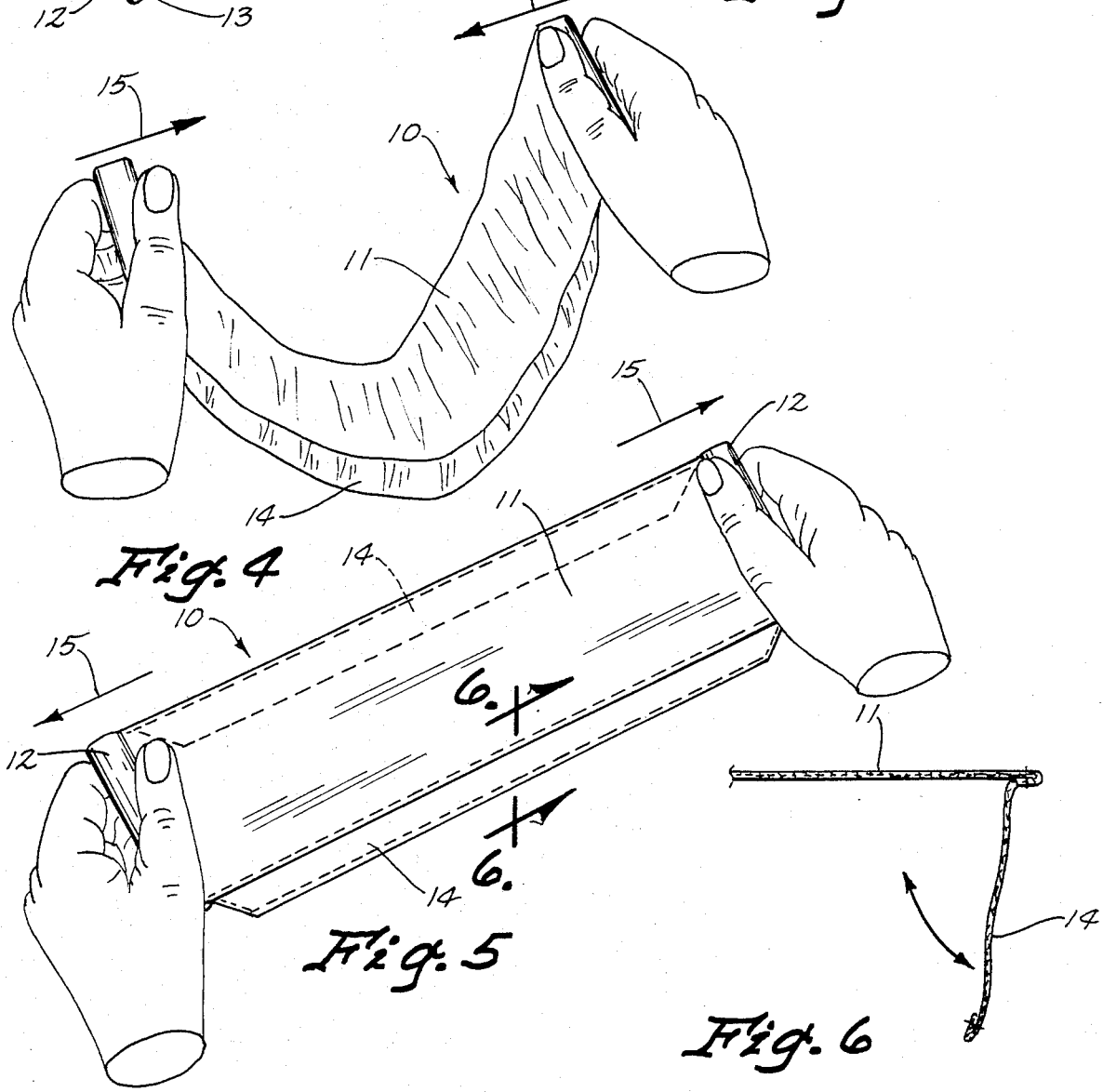

TURKEY CALLING AID

BACKGROUND OF THE INVENTION

The present invention relates generally to a turkey calling aid, and more particularly to such aid for simulating the sound of a turkey flying from its roost to the ground.

A traditional method for hunting wild turkeys, especially in the spring breeding season, is to use turkey calls of various types for imitating the sound of a hen turkey, thereby causing the male turkeys to be attracted to such sound thinking that it is approaching a hen turkey, rather than a hunter. Various types of turkey calls have been devised over the years such as box calls, a peg used to make a noise against a piece of slate and mouth calls, usually a diaphragm having one or more reeds attached thereto.

Wild turkeys tend to fly up into trees to roost as it is getting dark in the evening, and such turkeys tend to fly down from the roost to the ground just as it is getting light in the very early morning. When the wild turkeys fly from their roost to the ground they make a certain flapping noise and, it has been observed, that once the first turkey flies from its roost to the ground, it is not long thereafter that other turkeys in that immediate area will follow suit and fly down to the ground after that first turkey flies from its roost. The normal way to hunt turkeys is for a hunter to go into the woods while it is still dark and then wait until it begins to get light. As it is getting light, then the aforementioned turkey calls are used in order to attract male turkeys. In particular, it is desirable to try to get a turkey to fly from its roost down towards the hunter. Because of this situation, a hunter will typically try to call a turkey down from its roost in these very early dawn hours, often without success. It has been theorized that certain turkeys will not be fooled by these calls unless it has first heard a turkey fly from its roost down to where the sound is emanating from the hunter. For this reason, hunters have been known to slap their pant legs or their coat in various ways in order to try to imitate the sound of a wild turkey flying from its roost to the ground. The problem with this method is that it is very difficult to actually imitate the sound of a turkey flying from its roost to the ground, and furthermore the actual sounds produced by these hunters vary dramatically depending on the method used by the hunter, the type of clothing that the hunter is slapping with his hands, etc.

Consequently, there is a need for a turkey calling aid for the purpose of imitating the sound of a wild turkey flying down from its roost which is authentic in its sound, easy to use without having practiced extensively and being able to consistently produce the desired sound.

SUMMARY OF THE INVENTION

The present invention relates to a method and apparatus for calling wild turkeys using a strip of flexible cloth which is longer than wide and having a first end and a second end, a reinforcement structure at each end of the cloth for holding the ends straight, and flaps attached to each of the side edges of the cloth. The method includes the steps of grasping one end of the cloth with one hand, grasping the other end of the cloth with the other hand, moving the hands towards each other while holding the ends whereby the cloth is allowed to become loose, and rapidly jerking the hands apart while still holding the cloth to stretch the cloth tight, thereby simulating the sound of a wild turkey flapping its wings.

An object of the present invention is to provide an improved turkey calling aid.

Another object of the present invention is to provide a turkey calling aid which simulates the sound of a wild turkey flying from its roost in a tree to the ground.

A further object of the invention is to provide the aforementioned type of turkey calling aid which is consistent in its sound and easy to use without the need for extensive practicing thereon.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a turkey calling aid constructed in accordance with the present invention;

FIG. 2 is a cross-sectional view taken along line 2—2 of FIG. 1;

FIG. 3 is a cross-sectional view taken along line 3—3 of FIG. 1;

FIG. 4 is a perspective view of the present invention showing one step in the use thereof;

FIG. 5 is a perspective view of the present invention shown in a second step of use thereof; and FIG. 6 is a partial enlarged cross-sectional view taken along line 6—6 of FIG. 5.

DESCRIPTION OF THE PREFERRED EMBODIMENT

Referring now to the drawings wherein like reference numerals designate identical or corresponding parts throughout the several views, FIG. 1 shows a turkey calling aid 10 constructed in accordance with the present invention. The turkey calling aid 10 includes a center cloth portion in the form of a strip 11 which is constructed preferably of a nylon material and most preferably from such a nylon material being currently marketed under the trademark RIP STOP, which is commonly used for raingear or the like and has heavier lines of cloth in a checkerboard pattern therethrough for the purpose of preventing the cloth from tearing.

The ends of the cloth strip 11 have a loop 12 sewn therein and a reinforcement member 13 is disposed within the opening 12 in the ends of the turkey calling aid 10. This reinforcement 13 is made of wood in the preferred embodiment thereof, but it will be understood to those skilled in this art that other reinforcing materials can obviously be used. A pair of flaps 14 are attached to each of the side edges of the central cloth strip 11 for the purpose of muffling the sound of said apparatus when it is used as will be described below for the purpose of imitating the sound of a wild turkey flapping its wings as it flies from its roost in the tree down to the ground. The flaps 14 are preferably made in one piece with the main piece of cloth strip 11, but it is to be understood that these flaps can be sewn on separately if so desired.

The central cloth must have an area between the ends large enough to cause, when it is manually flapped in the air, an audible sound simulating the sound of a wild turkey flapping its wings.

In the preferred embodiment, the cloth strip 11 is approximately twenty inches (20″) long and five inches (5″) wide and the flaps 14 are approximately 1¾ inches wide and extend substantially from one end 12 to the other end 12 of cloth strip 11.

In operation, the turkey calling aid 10 is utilized by grasping the ends thereof so as to hold the strip extended widthwise in the fashion shown in FIG. 4 and moving the ends 12 closer together as shown by the arrows 15 in FIG. 4. Once the FIG. 4 position is achieved, or even when the hands are closer together than in the FIG. 4 position, cloth strip 11 will sag in an untwisted condition as shown. The hands are then jerked outwardly as quickly as possible to the position shown in FIG. 5. This will cause a popping noise which sounds just like a turkey flapping its wings. The flaps 14 as are shown in FIGS. 4–6 will tend to muffle the popping sound to an extent that it more closely simulates the actual sound of a turkey flapping its wings. In use, the motions shown in FIGS. 4 and 5 would be repeated rapidly for five to ten times, for example, depending on the number of times that the turkeys in the particular area being hunted tend to flap their wings while flying from the roost to the ground.

Normally, a hunter would not use the turkey calling aid 10 alone but would use such turkey calling aid 10 in combination with one of the other aforementioned types of turkey calls which are intended to imitate the sound that a hen turkey emits from its beak.

Obviously, many modifications and variations of the present invention are possible in light of the above teachings. For example, the motions of FIGS. 4 and 5 could be accomplished mechanically and still imitate the sounds of a wild turkey flying from its roost to the ground. It is therefore to be understood that, within the scope of the appended claims, the invention may be practiced otherwise than as specifically described.

I claim:

1. An apparatus for calling wild turkeys comprising:
   a strip of flexible cloth which is longer than wide and having a first end and a second end;
   reinforcement means at each end of said strip for holding said ends straight with the strip extended widthwise at said ends;
   the flexibility of said strip being such that at least a central portion of said strip sags under its own weight when the strip is suspended between said ends by holding said ends relatively close to each other, said strip having an area large enough to cause an audible sound simulating that of a game bird flapping its wings when the strip is repeatedly flexed and stretched in ambient air;
   flap means having a flexibility like that of said strip attached to each of the side edges of said strip for muffling the sound of said apparatus when said strip of cloth is rapidly stretched, said flap means being free of the extending effect of said reinforcement means.

2. The apparatus of claim 1 wherein said strip is of a camouflaged pattern to prevent a wild turkey from seeing it.

3. The apparatus of claim 1 wherein said strip is a RIP STOP brand cloth.

4. The apparatus of claim 1 wherein said strip is constructed of nylon material.

5. The apparatus of claim 1 wherein said reinforcement means comprises a loop of cloth formed in each of said ends of said strip and having a piece of wood disposed in each of said loops.

6. The apparatus of claim 1 wherein said strip is approximately 20 inches long and approximately 5 inches wide.

7. The apparatus of claim 6 wherein said flaps are approximately 1¾ inches wide and extend substantially from one reinforcement means to the other reinforcement means.

8. A method of calling wild turkeys using a single strip of flexible cloth which is longer than wide, said strip having a first end and a second end, the flexibility of said strip being such that at least a central portion of said strip sags under its own weight when the strip is suspended between said ends by holding said ends relatively close to each other, said method comprising:
   carrying said strip into the woods at or near dawn to an area where wild turkeys are considered likely to roost;
   grasping one end only of said strip with one hand so as to hold the strip extended widthwise;
   grasping the other end only of said strip with the other hand so as to hold the strip extended widthwise;
   moving said hands towards each other while so holding said ends whereby the strip is allowed to sag therebetween in a generally untwisted condition; and
   rapidly jerking said hands apart while still so holding said strip to stretch the strip tight, while at the same time preventing said strip from striking anything other than ambient air, thereby producing an audible sound simulating the sound of a wild turkey flapping its wings.

9. The method of claim 8 wherein said steps of moving and jerking the hands while holding the strip are repeated several times in succession to simulate the sound of a turkey flying from its roost to the ground.

10. A method of calling wild turkeys using a strip of flexible cloth which is longer than wide and having a first end and a second end, reinforcement means at each end of said strip for holding said ends straight, the flexibility of said strip being such that at least a central portion of said strip sags under its own weight when the strip is suspended between said ends by holding said ends relatively close to each other, and flap means of like flexibility attached to each of the side edges of said strip, said method comprising:
   grasping one end of said strip with one hand so as to hold the strip extended widthwise;
   grasping the other end of said strip with the other hand so as to hold the strip extended widthwise;
   moving said hands towards each other while so holding said ends whereby the strip is allowed to sag therebetween in a generally untwisted condition; and
   rapidly jerking said hands apart while still so holding said cloth to stretch the strip tight, thereby simulating the sound of a wild turkey flapping its wings, while at the same time preventing said strip from slapping against anything except ambient air.

* * * * *